(12) United States Patent
Faller et al.

(10) Patent No.: US 10,543,823 B2
(45) Date of Patent: Jan. 28, 2020

(54) PNEUMATIC BRAKE BOOSTER HAVING A RECESSED BEARING SURFACE

(71) Applicant: Continental Teves AG & Co. oHG, Frankfurt (DE)

(72) Inventors: Jürgen Faller, Kahl (DE); Juliano Muniz, São Paulo (BR); Gustavo Ladeira, São Paulo (BR); Fabio Gaiotto, Jardim das Hortênsias (BR); Marcelo Ideriha, Bairro Vila D. Pedro I (BR); Fabio Araujo, São Paulo (BR)

(73) Assignee: Continental Teves AG & Co. oHG, Frankfurt au Main (DE)

( * ) Notice: Subject to any disclaimer, the term of this patent is extended or adjusted under 35 U.S.C. 154(b) by 55 days.

(21) Appl. No.: 15/738,787

(22) PCT Filed: Jul. 7, 2016

(86) PCT No.: PCT/EP2016/066114
§ 371 (c)(1),
(2) Date: Dec. 21, 2017

(87) PCT Pub. No.: WO2017/009167
PCT Pub. Date: Jan. 19, 2017

(65) Prior Publication Data
US 2018/0186354 A1    Jul. 5, 2018

(30) Foreign Application Priority Data
Jul. 10, 2015  (DE) .......................... 10 2015 212 986

(51) Int. Cl.
*B60T 13/567* (2006.01)
*B60T 13/52* (2006.01)

(52) U.S. Cl.
CPC ............ *B60T 13/567* (2013.01); *B60T 13/52* (2013.01)

(58) Field of Classification Search
CPC ... B60T 13/565; B60T 13/567; B60T 13/1575
See application file for complete search history.

(56) References Cited

U.S. PATENT DOCUMENTS 3,499,288 A * 3/1970 Randol ................. B60T 13/565
60/554
4,325,218 A * 4/1982 Weiler ................ B60T 13/5675
60/547.1
(Continued)

FOREIGN PATENT DOCUMENTS

EP    0458192 A1 * 11/1991    ............. B60T 13/52
FR    2934547 A1    2/2010
(Continued)

OTHER PUBLICATIONS

International Search Report and Written Opinion for International Application No. PCT/EP2016/066114, dated Sep. 19, 2016, 7 Pages.

*Primary Examiner* — Thomas E Lazo
*Assistant Examiner* — Matthew Wiblin
(74) *Attorney, Agent, or Firm* — RatnerPrestia

(57) ABSTRACT

In order to minimize spreading, without additional parts, of connecting bolts of a pneumatic brake booster in a manner which is brought about by the deformation of a bearing surface on a booster housing before and during its assembly on a provided vehicle body part, it is proposed that the bearing surface is assigned a planar surface section in an immediately adjacent manner which is configured so as to be plane-parallel with respect to the bearing surface and so as to be axially inwardly recessed on the booster housing with a circumferential step.

5 Claims, 3 Drawing Sheets

(56) References Cited

U.S. PATENT DOCUMENTS

| | | | | |
|---|---|---|---|---|
| 4,330,996 A * | 5/1982 | Becht | ............ | B60T 13/565 |
| | | | | 60/581 |
| 4,428,274 A * | 1/1984 | Takeuchi | ............ | B60T 13/569 |
| | | | | 60/547.1 |
| 4,569,276 A * | 2/1986 | Kytta | ............ | B60T 13/567 |
| | | | | 403/349 |
| 4,785,628 A * | 11/1988 | Myers | ............ | B60T 13/567 |
| | | | | 60/547.1 |
| 5,211,018 A * | 5/1993 | Shinohara | ............ | B60T 13/563 |
| | | | | 60/547.1 |
| 5,335,582 A * | 8/1994 | Horner, Jr. | ............ | B60T 13/567 |
| | | | | 91/369.3 |
| 5,487,327 A * | 1/1996 | Schluter | ............ | B60T 13/565 |
| | | | | 92/128 |
| 5,784,946 A * | 7/1998 | Malosh | ............ | B60T 13/567 |
| | | | | 181/207 |
| 5,890,775 A * | 4/1999 | Tsubouchi | ............ | B60T 7/12 |
| | | | | 188/356 |
| 6,446,537 B1 * | 9/2002 | Tsubouchi | ............ | B60T 8/3275 |
| | | | | 303/155 |
| 2012/0304849 A1 | 12/2012 | Tanizawa et al. | | |

FOREIGN PATENT DOCUMENTS

| | | |
|---|---|---|
| GB | 2081403 A | 2/1982 |
| JP | 2007076437 A | 3/2007 |

\* cited by examiner

A - A

PNEUMATIC BRAKE BOOSTER HAVING A RECESSED BEARING SURFACE

CROSS REFERENCE TO RELATED APPLICATIONS

This application is the U.S. National Phase Application of PCT International Application No. PCT/EP2016/066114, filed Jul. 7, 2016, which claims priority to German Patent Application No. 10 2015 212 986.1, filed Jul. 10, 2015, the contents of such applications being incorporated by reference herein.

FIELD OF THE INVENTION

The invention relates to a pneumatically operating brake booster for a hydraulic motor vehicle brake system.

BACKGROUND OF THE INVENTION

Brake boosters of this type are widespread and are generally attached to a vehicle body part—usually the splash wall—in the engine compartment of a vehicle by means of two or more connecting bolts. For efficient mounting, the connecting elements are secured on or in the housing of the brake booster. During the mounting of the brake booster, the above-mentioned connecting elements are plugged through corresponding breakthroughs in the vehicle body part and are secured from the opposite side.

A strong, axially acting compression spring—the restoring spring—is fastened in the interior of the booster housing of brake boosters of the generic type. In a brake booster which is not yet mounted in the vehicle, the spring force brings about slight elastic deformation of the booster housing, and in the process the connecting elements which were originally arranged parallel to one another are spread apart. This can lead to mounting problems, because the corresponding pattern of holes on the splash wall no longer fits in an optimum way.

In order to counteract the problem with the spread-apart connecting bolts during mounting, it is known to attach, in the region of the bearing surface in the interior of the booster housing, additional, separate reinforcement components which avoid or reduce the tendency to spread apart. In such solutions, the greater system weight, the costly manufacture and the mounting with a large number of process offsets and therefore the higher costs are considered to be disadvantageous.

US 2012/0304849 A1, which is incorporated by reference, discloses a different approach to a solution in which the planar bearing surface on the rear side of the booster housing is configured in a star shape with 8 rounded arms which extend, at their radial outer edge, into the rest of the rear wall of the booster housing, which is correspondingly configured in a corrugated fashion in the circumferential direction. Although such a structure does not require additional parts, it brings about a massive undesired increase in the "dead volume" in the working chamber—the space between the rear wall and the movable wall in the interior of the housing. This worsens the response behaviour of the brake booster and more air has to be evacuated after each braking process.

SUMMARY OF THE INVENTION

An aspect of the invention is based on offering an improved brake booster which can be easily mounted in a vehicle and avoids the above-mentioned disadvantages.

Since a planar surface section which is inwardly recessed in an axially plane-parallel fashion by means of a circumferential offset is assigned to the bearing surface in a directly adjacent fashion, a significant increase in rigidity can be achieved without additional elements. At the same time, the dead volume is not increased, since the surface section is recessed in the direction of a movable wall, and therefore reduces the dead volume. The tooling costs are not increased by spatially relatively simple shaping.

In one embodiment according to an aspect of the invention, the surface section can be configured so as to extend radially outward into a conically embodied annular section of the booster housing, as a result of which the rigidity is increased by a further axial bend in the wall of the booster housing and the dead volume is reduced further, as a result of which the rear wall of the booster housing is repositioned even closer to the movable wall.

On the basis of a next development, the annular section can be formed offset axially inward, by means of a circumferential offset (14), with respect to an outer wall section which surrounds the annular section radially. This further increases the rigidity of the booster housing and the noise emissions are reduced because relatively large spanned surfaces are broken up into relatively small sections, and as a result natural frequencies are significantly increased. Booming noises are effectively reduced.

On the basis of one particularly preferred development, the outer wall section is configured conically here, wherein the angle of inclination of the annular section is preferably embodied so as to be unequal to the angle of inclination of the outer wall section, as a result of which the risk of booming owing to different sound radiation angles is reduced further with further increased rigidity.

In one preferred embodiment according to the invention, the bearing surface comprises an inner central region as well as at least two outer external regions which project radially beyond the central region, wherein the connecting bolts are each connected at the external regions to the booster housing.

In one preferred development, the radial extent of the external regions and the profile of the offset in its sections adjoining the external regions are configured in such a way that the offset does not run into the planar surface section there but rather directly into the annular section. As a result, the critical connecting regions of the connecting bolts to the booster housing are selectively embodied in a particularly rigid fashion, and the force flux from the connecting bolt into the booster housing is optimized.

Aspects of the invention will be explained in more detail below on the basis of various exemplary embodiment of the invention. Because the design and method of functioning of brake boosters of the generic type are well known, only the aspects which are relevant to the invention are explained below.

DETAILED DESCRIPTION OF THE PREFERRED EMBODIMENTS

Figure 1:
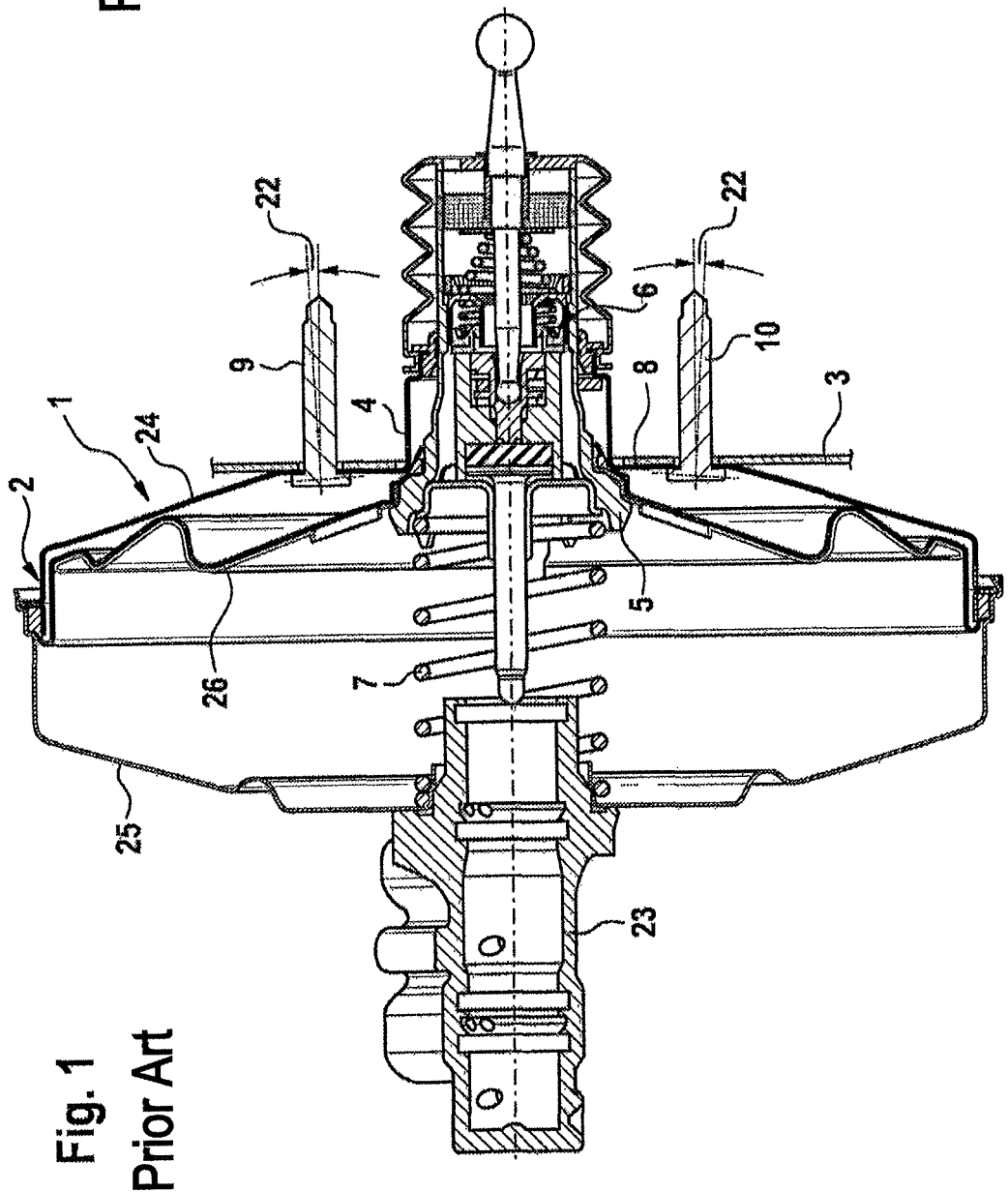
FIG. 1 shows a sectional view of a known brake booster of the generic type, with a master brake cylinder mounted thereon.

A known pneumatic brake booster 1, which is presented in FIG. 1, has a booster housing 2 which can be attached, on its side illustrated on the right here, to a vehicle body part 3. On the opposite side, the housing of a master brake cylinder 23 is illustrated. The booster housing 2 comprises two housing shells—a rear housing shell 24 on the vehicle body side and its front housing shell 25 on the master brake cylinder side, which housing shell shells 24, 25 are arranged in series axially along the central axis A and connected to one another. In addition to the illustrated single brake booster, the invention can also extend to a tandem brake booster.

The rear housing shell 24 of the booster housing 2 forms a central tube 4 which extends axially outward in the direction of the vehicle body part 3. An axially shiftable control housing 5 with a valve arrangement 6 which is accommodated therein and controls the brake booster 1 is partially arranged in the tube 4. An axially movable wall 26 conducts the boosting force of the brake booster 1 into the control housing 5 coupled thereto. Furthermore, the booster housing 2 forms a level bearing surface 8 which extends radially outward from the shoulder of the tube 4, orthogonally with respect to the central axis A, and in the state in which it is mounted ready for operation bears against the vehicle body part 3.

At its radial external edge, the essentially planar end face 8 extends into a conical rear wall of the booster housing 2. Two screw-like connecting bolts 9, 10 are provided for connecting the brake booster 1 to the vehicle body part 3 and are connected in a rotationally secured fashion to the wall of the booster housing 2 within the bearing surface 8.

A restoring spring 7 is arranged in an elastically prestressed fashion between the control housing 5 and the master-brake-cylinder-side inner wall, lying opposite the control housing 5, of the booster housing 2. The restoring spring 7 is embodied as a compression spring and serves essentially to reset the control housing 5 into its unactuated initial position after a braking process. The restoring spring 7 acts, with its prestressing force, along the central axis A on the thin-walled booster housing 2 in such a way that the latter becomes elastically deformed in the axial direction. The bearing surface 8 arches in the process, causing the connecting bolts 9, 10 to be tilted outward or spread apart, in each case by a spreading angle 22, from their original axis-parallel normal position. In the case of a relatively long storage of a non-mounted brake booster 1 under continuous spring loading, the degree of spreading can additionally increase here.

Figure 2:
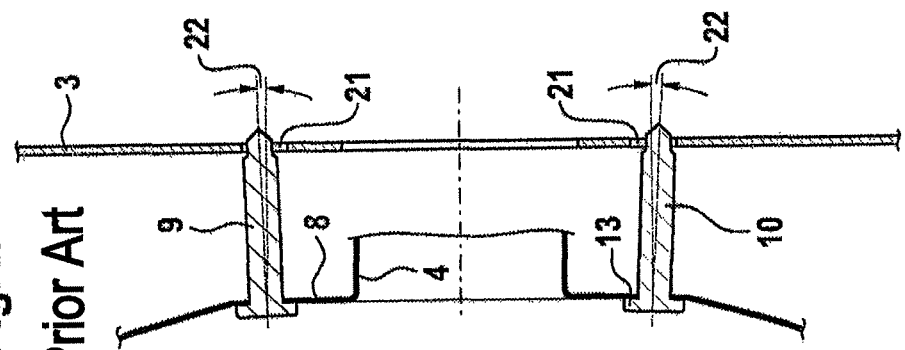
FIG. 2 shows a simplified detail view clarifying the mounting problem with connecting bolts which are spread apart.

FIG. 2 illustrates the effect described above and the effects on the mounting of the brake booster 1. The booster housing 2 is mounted on a vehicle body part 3—at least of a splash wall in the engine cavity. Corresponding breakthroughs 21 for the connecting bolts 9, 10 are accordingly arranged at a defined distance from one another in the vehicle body part 3. The hole spacing corresponds here to the distance between the connecting bolts 9 and 10 in the region of their connection to the booster housing 2.

However, the spreading apart of the connecting bolts 9 and 10 increases the distance between their tips, with the result that the corresponding pattern of holes on the vehicle body part 3 no longer fits in an optimum way. It is undesirable here to make the breakthroughs 21 larger because the positioning accuracy would suffer, and furthermore vehicle-body-side nuts with relatively large external diameter would be necessary.

Figure 3:
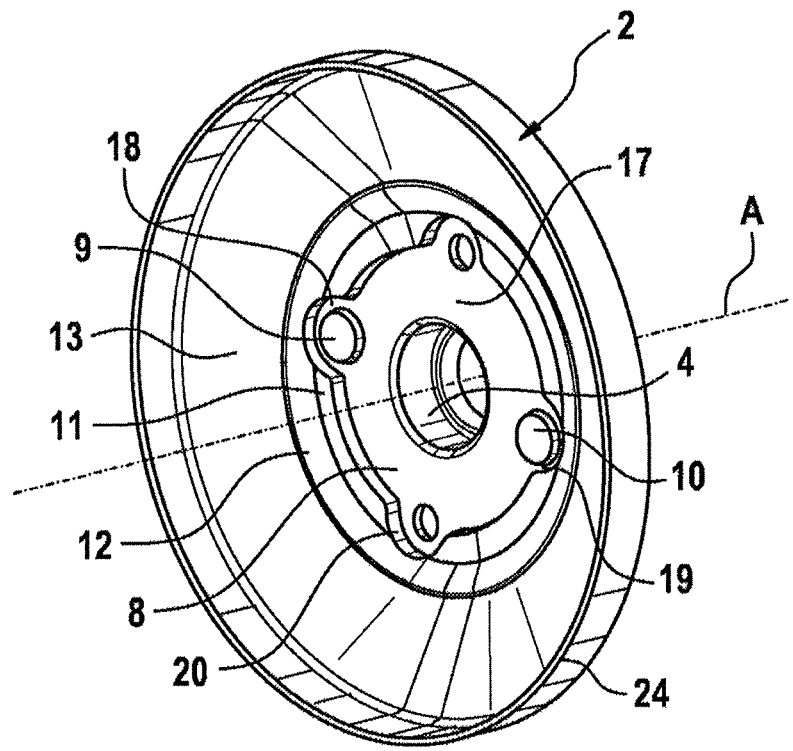
FIG. 3 shows an internal view of the rear wall of a booster housing of a brake booster which has been improved according to an aspect of the invention.
Figure 4:
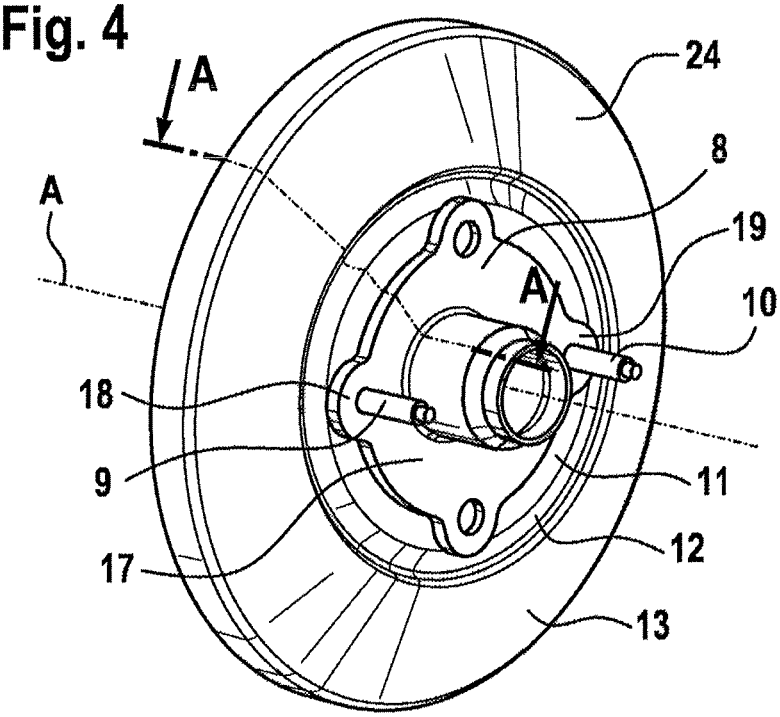
FIG. 4 shows an external view of the rear wall of a booster housing according to FIG. 3.

FIG. 3 shows the internal view and FIG. 4 shows the external view of the rear wall or of the rear housing shell 24 of an embodiment according to the invention of a brake booster 1.

The tube 4 is surrounded by a planar bearing surface 8 which extends radially and orthogonally with respect to the central axis A. The bearing surface 8 comprises an internal central region 17 as well as outer external regions 18, 19 which project radially over the central region 17 and in which two connecting bolts 9 and 10 are also attached to the booster housing 2.

In the embodiment shown, there are two external regions 18 and 19 which lie opposite one another and have connecting bolts 9 and 10 as well as two further external regions which are arranged offset in the circumferential direction and have openings for further connecting elements (not shown). A different number and arrangement of the external regions are also permissible within the invention.

A planar surface section 11 is formed on the booster housing 2 directly next to the bearing surface 8, radially on the outside thereof. The surface section 11 is arranged plane-parallel with respect to the bearing surface 8 and is recessed axially inward by a circumferential offset 20.

At its radial external edge, the surface section 11 extends radially into a conically embodied annular section 12 of the housing wall of the booster housing 2.

The annular section 12 extends in the radial direction essentially between the surface section 11 and a circumferential offset 14. As a result of this offset 14, the annular section 12 is recessed axially inward with respect to an outer wall section 13 which directly surrounds the offset 14 axially inward.

Figure 5:
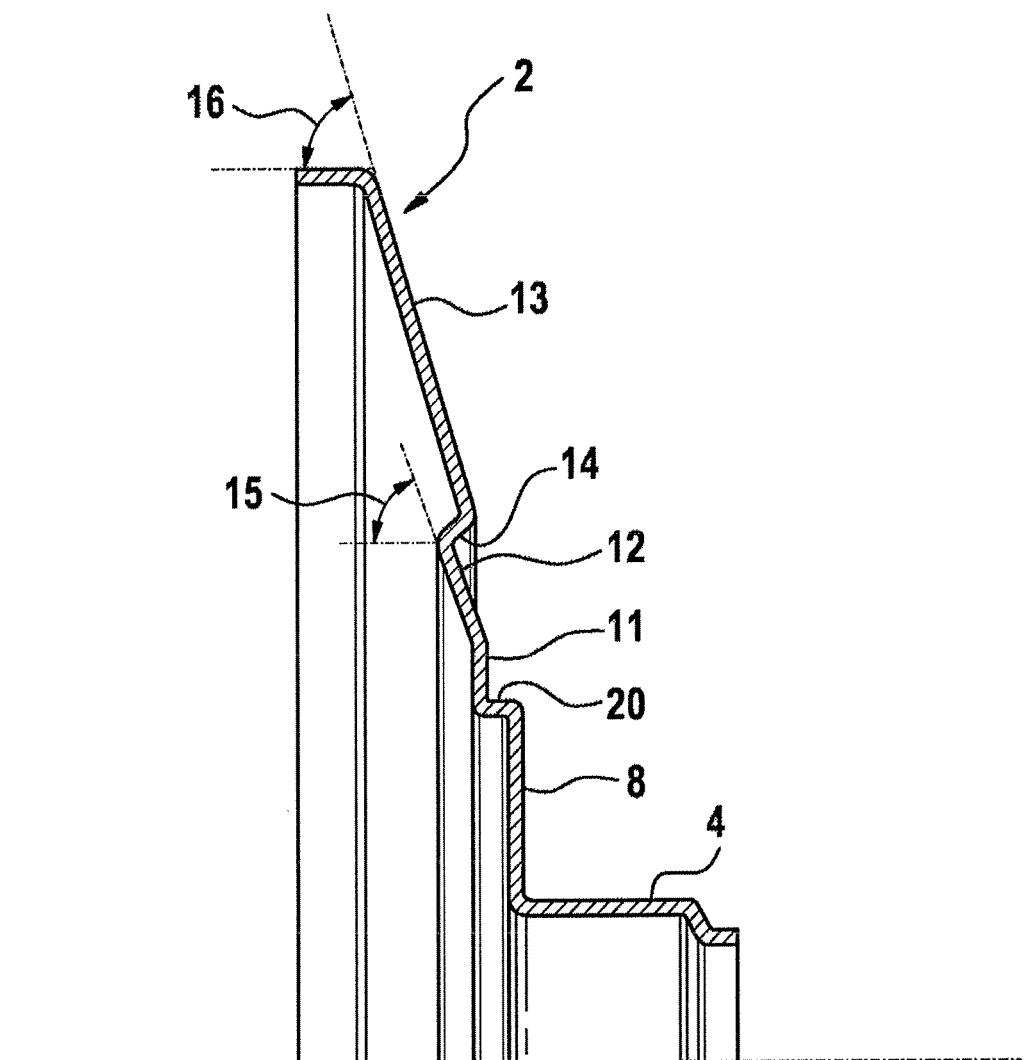
FIG. 5 shows a partial section of an embodiment of a booster housing according to FIG. 4.

FIG. 5 illustrates the facts described above, in a sectional view along the section A-A according to FIG. 4.

In this context, it is illustrated, in particular, that both the annular section 12 and the outer wall section 13 are shaped in a conical or tapering fashion. In the illustrated example, the angle of inclination 15 of the annular section 12 is embodied so as to be smaller than the angle of inclination 16 of the outer wall section 13. Within the invention, the angles of inclination 15, 16 can also be configured with a different ratio with respect one another, but preferably so as to be unequal.

The formation which is described above, which comprises in each case the annular section 12, the circumferential offset 14 and the wall section 13 and is present only once in the example model shown, can, within the invention, be provided in further embodiments (not shown here), also arranged multiply one behind the other in a radial direction.

LIST OF REFERENCE SIGNS

1 Brake booster
2 Booster housing
3 Vehicle body part
4 Tube
5 Control housing
6 Valve arrangement
7 Restoring spring
8 Bearing surface
9 Connecting bolt 10 Connecting bolt
11 Surface section
12 Annular section
13 Wall section
14 Step
15 Angle of inclination of annular section
16 Angle of inclination of wall section
17 Central region
18 External region
19 External region
20 Offset
21 Breakthrough
22 Spreading angle
23 Master brake cylinder
24 Rear housing shell
25 Front housing shell
26 Movable wall
A Central axis

The invention claimed is:

1. A pneumatic brake booster for a hydraulic motor vehicle brake system having a booster housing of which is configured to attach to a vehicle body part, wherein the booster housing has, on the vehicle body part side, a central tube in which an axially slidable control housing, which accommodates a valve arrangement, is at least partially arranged, wherein a planar bearing surface, for bearing on the vehicle body part, is formed on the booster housing and extends radially outward from the tube orthogonally with respect to a central axis, wherein at least two connecting bolts for connecting the brake booster to the vehicle body part connect to the booster housing and are arranged projecting axially outward through the bearing surface, wherein a restoring spring for resetting the control housing to its unactuated initial position is arranged prestressed between the control housing and an inner wall, lying opposite, of the booster housing, wherein the bearing surface is assigned a planar surface section in a directly adjacent manner, wherein the planar surface section is embodied so as to be plane-parallel with respect to the bearing surface and axially inwardly recessed on the booster housing with a circumferential offset, wherein the bearing surface comprises an inner central region as well as at least two outer external regions which project radially beyond the central region, wherein the connecting bolts are each connected at the external regions to the booster housing, and wherein an inner radial edge of the planar surface section is radially outward relative to an outer radial edge of the central region of the bearing surface.

2. The brake booster as claimed in claim 1, wherein the surface section is configured extending radially outward into a conical annular section of the booster housing.

3. The brake booster as claimed in claim 2, wherein the annular section is formed offset axially inward, by a circumferential offset, with respect to an outer wall section which radially surrounds the annular section.

4. The brake booster as claimed in claim 3, wherein the outer wall section is of conical construction, and wherein an angle of inclination of the annular section is unequal to an angle of inclination of the outer wall section.

5. The brake booster as claimed in claim 2, wherein the offset is embodied so as to intersect the conical annular section immediately adjacent the at least two outer external regions.

* * * * *